May 19, 1931. L. B. HENDRICKSON 1,805,824
AIR FILTER
Filed Aug. 23, 1929
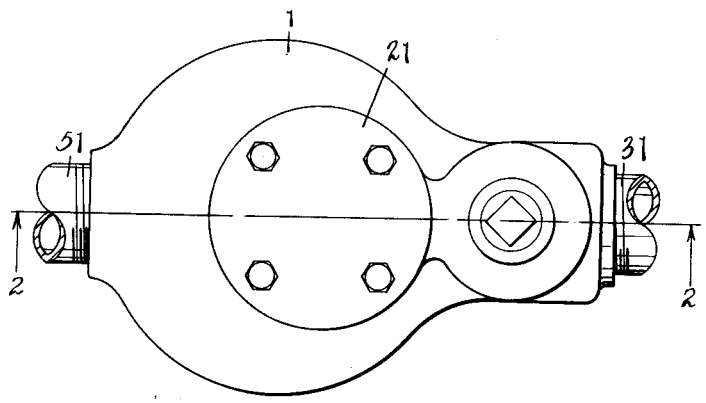
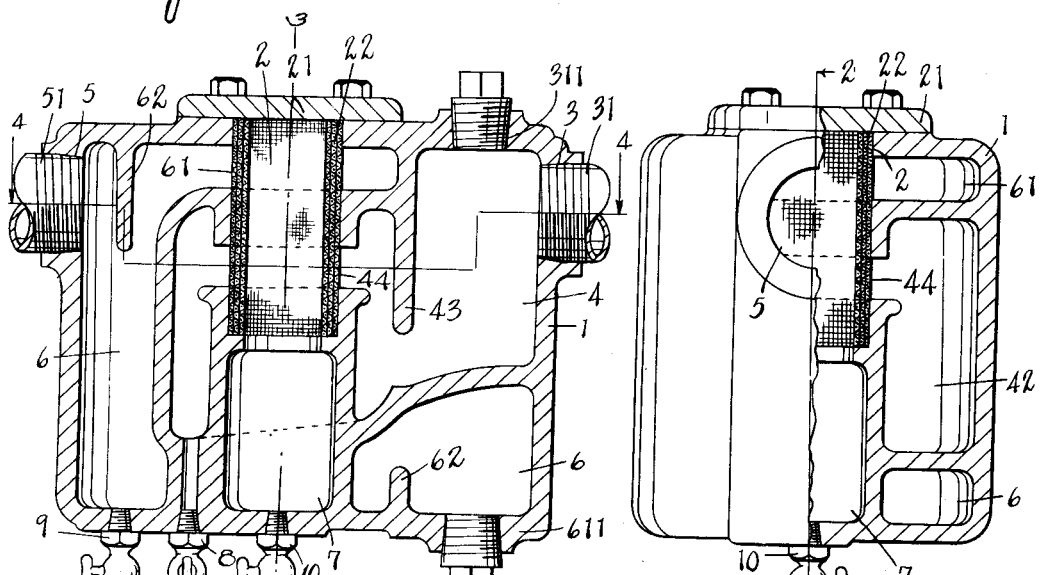
INVENTOR
Leo B. Hendrickson
BY Chappell & Earl
ATTORNEYS Patented May 19, 1931

1,805,824

UNITED STATES PATENT OFFICE

LEO B. HENDRICKSON, OF BATTLE CREEK, MICHIGAN, ASSIGNOR TO UNION STEAM PUMP COMPANY, OF BATTLE CREEK, MICHIGAN

AIR FILTER

Application filed August 23, 1929. Serial No. 388,021.

The objects of this invention are:

First, to provide a double air filter that is simple and economical in construction.

Second, to provide a double filter means which can be removed and cleaned very expeditiously.

Further objects and objects pertaining to details and economies of construction and operation will appear from the description to follow. The invention is defined in the claims.

A preferred embodiment of my invention is illustrated in the accompanying drawings, in which:

Fig. 1 is a top plan of my improved filter device.

Fig. 2 is a vertical sectional elevation on line 2—2 of Figs. 1, 3 and 4, parts shown in full lines.

Fig. 3 is a vertical partial cross-sectional elevation of the filter for further illustrating the ports therein on line 3—3 of Figs. 2 and 4.

Fig. 4 is a horizontal section on irregular line 4—4 of Figs. 2 and 3.

The parts will be identified by their numerals of reference which are the same in all the views.

1 is the shell or body of my improved filtering device. 2 is the central cylindrical screen chamber. 21 is the cover of the screen chamber and closure for the shell. 22 is the screen strainer made up of a scroll of fine woven wire screen of many layers. It collects water all through its meshes which drains down into the collecting chambers.

3 is the inlet opening into the shell 1 and 31 is the inlet pipe connection. 4 is the inlet chamber to which pipe 31 connects and embraces the screen chamber 2 in annular form at 42. 43 is a downwardly projecting deflector to deflect air at the intake. 44 is an annular air delivery port through the screen from the outside in.

5 is the air outlet. 51 is the outlet pipe connection. 6 is the air outlet chamber, annular in form, embracing the upper and lower portions of the screen chamber 2 to which it connects by annular port 61. 62, 62 are outlet deflectors.

7 is the auxiliary collecting chamber beneath and connecting to the bottom of the screen chamber 2 beneath the open bottom end of the screen 21 and surrounded by intake chamber 4 which forms an annular collecting receptacle around chamber 7. The lower part of the chamber 6 is also a collecting chamber. 8, 9 and 10 are drain cocks for the bottoms of chambers 4, 6 and 7, respectively.

311 is a second inlet opening for vertical connection suitably plugged. 611 is a second outlet opening for vertical connection suitably plugged. The outlets and inlets may be reversed, that is, 51 may be an inlet and 31 an outlet.

In use air enters my filter through pipe 31 in inlet opening 3 to the intake chamber 4, thence through the screen 22 at the annular port 44, particles of water or impurities dropping to the bottom of the chamber 4. The air which has entered the screen at port 44 drops particles of water and impurities into chamber 7 and is screened a second time as it passes out at the annular port 61 to the outlet chamber 6, where the very small remainder of water or impurities has opportunity to collect.

Pipe 31 may connect vertically at inlet 311. The discharge pipe may connect vertically at 611. This makes connection universal without extra fittings.

The screen 22 can be easily removed by opening the cover 21. Water is mainly the material sought by the screen. The chambers can be cleared by opening the drain cocks and blowing air therethrough.

The structure can be much modified in detail. I have shown a preferred form which I claim specifically. I wish to claim the invention in its broad aspects as pointed out in the appended claims. The direction of the air can be reversed and very good work be done.

Having thus described my invention, what I claim as new and desire to secure by Letters Patent, is:

1. In an air filter, the combination of an outer shell, a central cylindrical screen chamber with a cover at one end thereof and a collecting well at the other, a cylindrical screen scroll therein, an annular intake chamber with an intake connection and surrounding and connecting with said screen chamber and connected thereto by an annular port, and an annular outlet chamber having outlet connection, said outlet chamber surrounding and communicating with a part of said screen chamber and connected thereto by an annular port.

2. In an air filter, the combination of an outer shell, a central cylindrical screen chamber with a cover at one end thereof and a collecting well at the other, a cylindrical screen scroll therein, an annular intake chamber with an intake connection and surrounding and connecting with said screen chamber and connected thereto by an annular port, and an annular outlet chamber having outlet connection, said outlet chamber communicating with a part of said screen chamber and connected thereto by an annular port.

In witness whereof I have hereunto set my hand.

LEO B. HENDRICKSON.